United States Patent
Linlor

(10) Patent No.: US 10,040,196 B2
(45) Date of Patent: Aug. 7, 2018

(54) SYSTEM AND METHOD FOR IN-FLIGHT ROBOTIC ARM RETARGETING

(71) Applicant: Technologies Holdings Corp., Houston, TX (US)

(72) Inventor: Peter M. Linlor, Pearland, TX (US)

(73) Assignee: Technologies Holding Corp., Houston, TX (US)

( * ) Notice: Subject to any disclaimer, the term of this patent is extended or adjusted under 35 U.S.C. 154(b) by 55 days.

(21) Appl. No.: 15/204,768

(22) Filed: Jul. 7, 2016

(65) Prior Publication Data

US 2018/0009106 A1    Jan. 11, 2018

(51) Int. Cl.
   *B25J 9/16*   (2006.01)

(52) U.S. Cl.
   CPC .................. *B25J 9/1664* (2013.01)

(58) Field of Classification Search
   CPC ........ B25J 9/1664; B25J 9/1666; B25J 5/005; B25J 9/06; B25J 9/161; G05B 19/4061; G05B 2219/40438; G05B 2219/40317; G05D 1/02; Y10S 901/01; Y10S 901/02
   USPC ........................................................ 700/245
   See application file for complete search history.

(56) References Cited

U.S. PATENT DOCUMENTS

| | | | | |
|---|---|---|---|---|
| 5,737,500 A | * | 4/1998 | Seraji | B25J 9/1643 318/568.11 |
| 5,740,327 A | * | 4/1998 | Funaya | G05B 19/416 700/254 |
| 9,221,175 B2 | * | 12/2015 | Iwasaki | B25J 9/1664 |
| 9,586,316 B1 | * | 3/2017 | Swilling | B25J 9/1664 |
| 2009/0074979 A1 | * | 3/2009 | Krogedal | G05B 19/404 427/427.2 |
| 2012/0083947 A1 | * | 4/2012 | Anderson | B60W 30/09 701/3 |
| 2016/0008979 A1 | * | 1/2016 | Kirsten | B25J 9/1676 700/255 |
| 2016/0089789 A1 | * | 3/2016 | Sato | B25J 11/005 700/254 |
| 2016/0332297 A1 | * | 11/2016 | Sugaya | B25J 9/161 |
| 2017/0036232 A1 | * | 2/2017 | Hoffman | B05D 1/02 |

* cited by examiner

*Primary Examiner* — Jaime Figueroa
(74) *Attorney, Agent, or Firm* — Baker Botts L.L.P.

(57) ABSTRACT

A system comprising a robotic arm and a robotic arm controller. The robotic arm receives instructions from the robotic arm controller and moves along a path. The robotic arm controller comprises an interface, a memory, and a processor. The interface communicates with the robotic arm. The memory stores a first path and a second path. The processor applies a decreasing weight to the waypoints of the first path and an increasing weight to the waypoints of the second path. The processor combines the weighted waypoints of the first path and the second path to generate a third path wherein the third path defines a transition path from the first path to the second path. The processor further instructs the robotic arm to transition from the first path to the second path by traversing the third path.

20 Claims, 2 Drawing Sheets

SYSTEM AND METHOD FOR IN-FLIGHT ROBOTIC ARM RETARGETING

TECHNICAL FIELD OF THE INVENTION

This disclosure relates generally to robotics and more particularly to systems and methods for in-flight robotic arm retargeting.

BACKGROUND OF THE INVENTION

The use of robotic devices in various industries has increased over time. One use of such robots is for moving objects. However, the movement of robotic devices is often harsh and can damage both the payload and the robot. Thus, systems for smoother movement of robotic devices are needed.

SUMMARY OF THE INVENTION

A system comprising a robotic arm and a robotic arm controller is disclosed. The robotic arm is operable to receive instructions from the robotic arm controller and move along a path. The robotic arm controller comprises an interface, a memory, and a processor. The interface is operable to communicate with the robotic arm. The memory is operable to store a first path defining an original path for the robotic arm movement. The first path comprises a first set of ordered waypoints ranging from a first initial waypoint defining the beginning of the first path to a first final waypoint defining the ending of the first path. Further, each waypoint defines a location and velocity with which to approach that location. The memory is also operable to store a second path defining a first modified path for the robotic arm movement. The second path comprises a second set of ordered waypoints ranging from a second initial waypoint defining a beginning of the second path to a second final waypoint defining an ending of the second path. The processor is operable to apply a weight to each waypoint of the first path. The weight associated with each waypoint of the first path decreases at a determined rate so that the first initial waypoint has a first highest weight and the first final waypoint has a first lowest weight. The processor is further operable to apply a weight to each waypoint of the second path, where the weight associated with each waypoint of the second path increases at the first determined rate so that the second initial waypoint is associated with the first lowest weight and the second final waypoint is associated with the first highest weight. The processor is also operable to combine the first set of weighted waypoints and the corresponding second set of weighted waypoints to generate a third path wherein the third path defines a transition path from the first path to the second path. The processor is further operable to instruct the robotic arm to transition from the first path to the second path by traversing the third path.

The present embodiment presents several technical advantages. For example, in the present embodiment, a controller is operable to direct a robotic arm to a specified destination. Further, in the present embodiment, a robotic arm is operable to move along a specified path and transition from one path to another. Additionally, the controller of the present embodiment is operable to create the transition paths by assigning weights to waypoints in a path and increasing or decreasing the weights as the paths progress. This allows the robotic arm of the present embodiment to transition between the paths in a more gradual manner. The present embodiment further enables a robotic arm to transition from a first path to a second path without needing to complete the first path. Further, the present embodiment allows a controller to dynamically move a robotic arm from one transition path to a second transition path.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
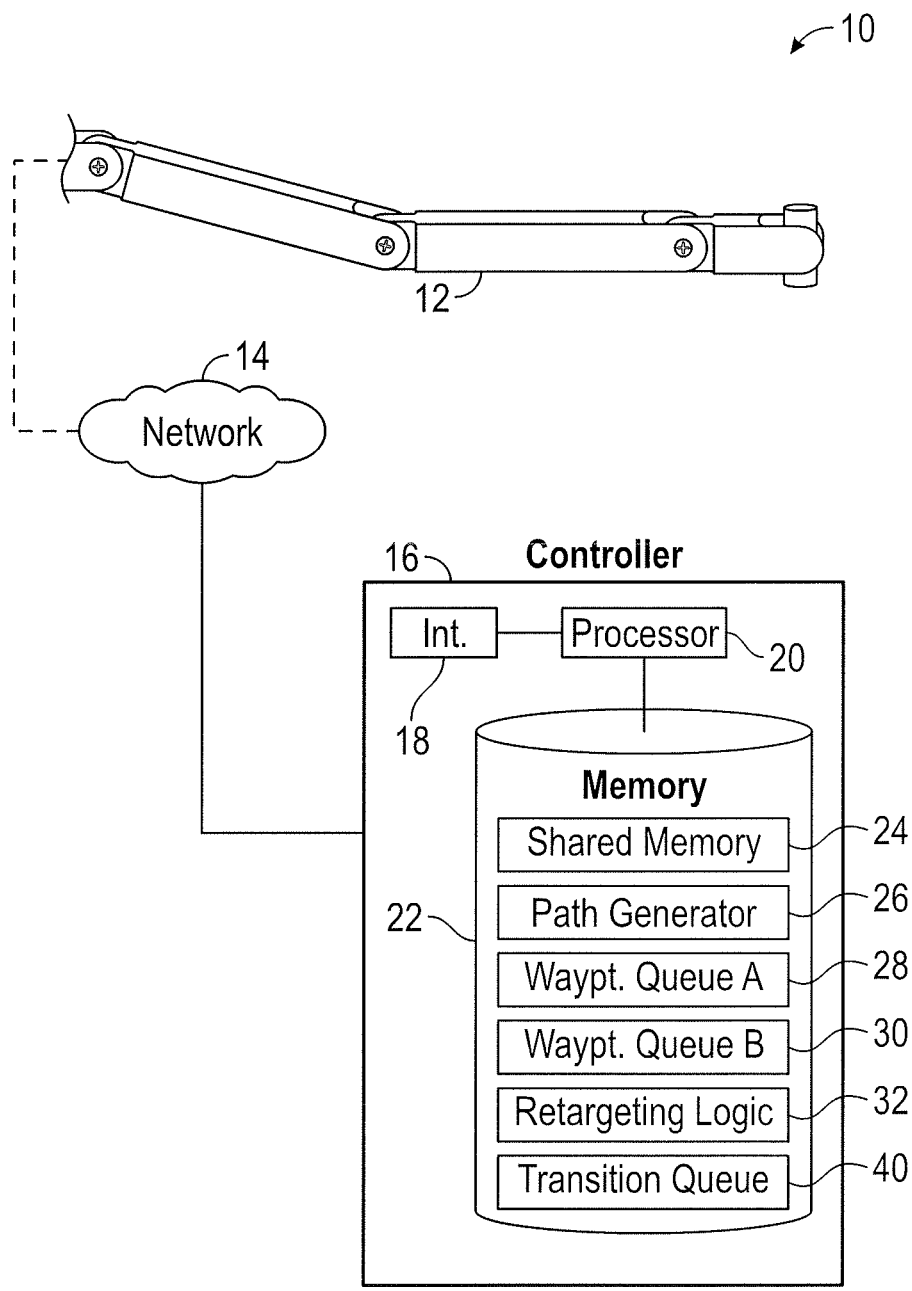
FIG. 1 illustrates a general overview of an in-flight retargeting system for a robotic arm.
Figure 2:
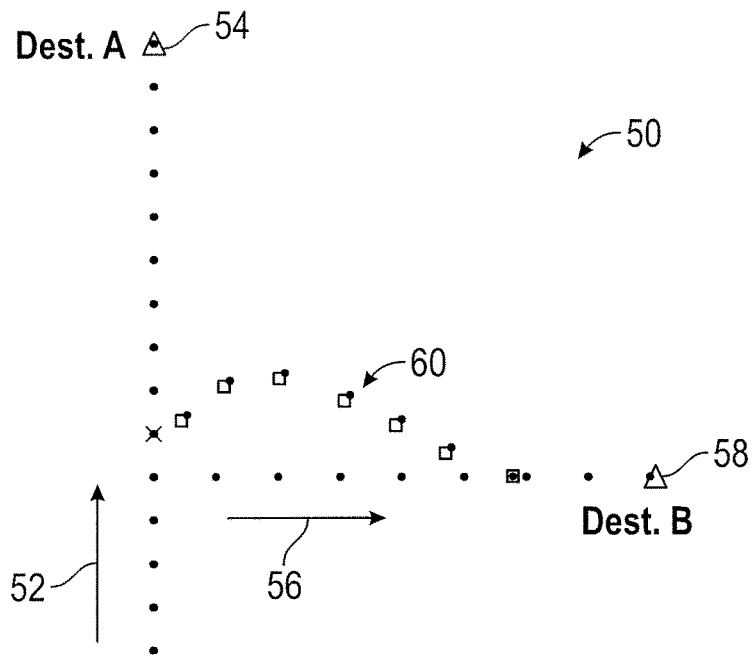
FIG. 2 illustrates an example retargeting path for a robotic arm.
Figure 3:
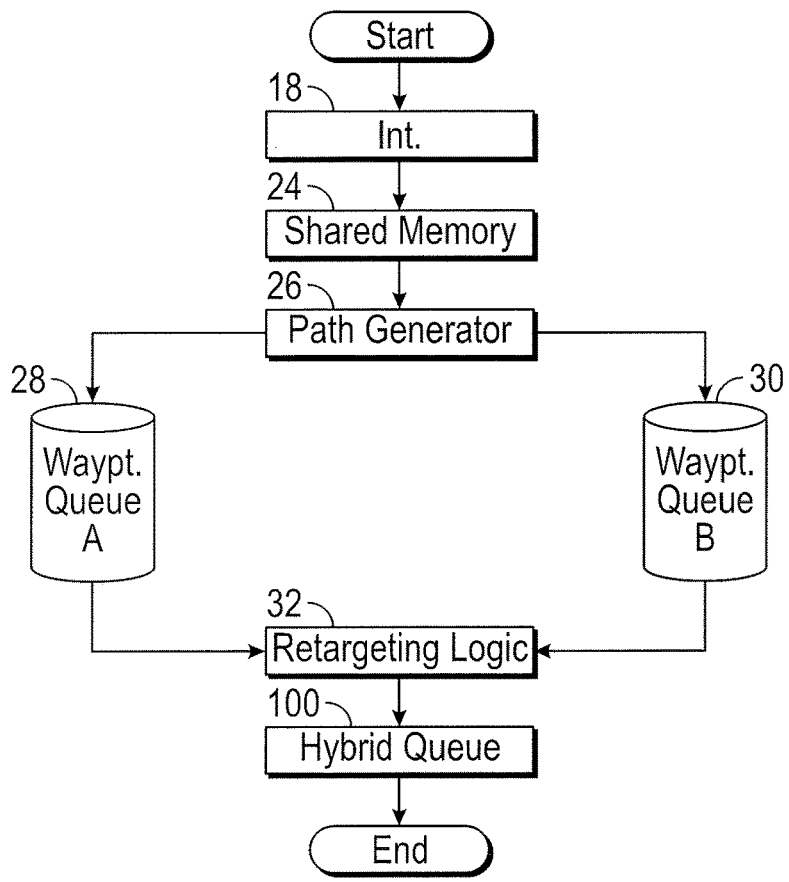
FIG. 3 illustrates the components of a robotic arm controller and process for in-flight retargeting.

Embodiments of the present disclosure and its advantages are best understood by referring to FIGS. 1 through 3 of the drawings, like numerals being used for like and corresponding parts of the various drawings In various industries, it is advantageous to use robotics to perform certain tasks. For example, in the dairy industry, robots can be used to facilitate milking dairy animals by using a robotic arm to position milking cups or teat preparation cups onto dairy animal teats and extracting milk from the dairy animals. In other industries, such as the automotive industry, robotics can be used to lift and position heavy equipment inside vehicles.

One drawback of using robots is that robotic movement typically occurs in discrete steps which lead to harsh transitions. For example, a robotic arm tasked with moving to a first position and then to a second position will either abruptly stop its current movement and start moving to the second position or complete its current task and then move to the second position even if the first movement is no longer required. These transitions are both inefficient and jarring. In some instances, these transitions can cause the robotic arm to collide with other objects, can cause damage to the payload being moved by the robot, and, in the case of dairy farming, can startle or injure the dairy animal.

The embodiments of the present disclosure address several of these drawbacks. In one embodiment, an in-flight retargeting system is disclosed. In this embodiment, a robotic arm moves along a series of waypoints that define paths. A waypoint comprises positional and velocity data. For example, a waypoint might comprise coordinates and the velocity with which the robotic arm approaches those coordinates. In one embodiment of the disclosed system, when a robotic arm is moving along a first path and is instructed to transition to a second path, the system creates a hybridized transition path for the robotic arm to smoothly transition from the first path to the second path. To create this transitional path, the system first assigns weights to each waypoint of the first path and each waypoint of the second path. As illustrated in the example below, these weights gradually decrease in value along the first path and gradually increase in value along the second path. The system then creates the transition path by combining the weighted waypoints of the first path to the weighted waypoints of the second path. In this manner, the transition path starts weighted heavily toward the first path and ends weighted heavily toward the second path.

As an illustrative example, the first path may comprise waypoints a, b, c, and d. The second path may comprise waypoints w, x, y, and z. As the robotic arm is moving along the first path, the robotic arm may be instructed to transition from the first path onto the second path. Without the in-flight retargeting system of the present disclosure, the robotic arm may transition from the first path to the second path by moving along the path: [a; b; c; d; w; x; y; z] or [a; b; w; x; y; z], where each of a; b; c; d; w; x; y; and z define coordinates and a velocity with which to approach those coordinates. In the first scenario, the robotic arm's movements are inefficient because the arm has to reach the end of the first path at point "d" before it may move onto the second path to arrive at the desired destination "z." In the second scenario, the robotic arm's transition is abrupt and jarring because the arm suddenly changes direction and velocity as it jumps from waypoint "b" of the first path to waypoint "w" of the second path.

Using the in-flight retargeting system of the present disclosure, the robotic arm transitions from the first path to the second path in a more gradual and seamless manner. In this example, once the robotic arm receives instructions to transition from the first path to the second path, the in-flight retargeting system creates a third transition path. This transition path may have the following waypoints: [a+0*w; 0.67*b+0.33*x; 0.33*c+0.67*y; 0*d+z]. In this manner, the robotic arm transitions from the first path [a; b; c; d] to the second path [w; x; y; z] in a gradual and efficient manner to arrive at the desired destination "z."

The present disclosure will be described in more detail using FIGS. 1 through 3. FIG. 1 illustrates a general overview of an in-flight retargeting system for a robotic arm. FIG. 2 illustrates an example retargeting path for a robotic arm. And FIG. 3 illustrates the components of a robotic arm controller and an example process for in-flight retargeting.

FIG. 1 illustrates a system 10 comprising a robotic arm 12, a network 14, and a controller 16. Controller 16 further comprises an interface 18, a processor 20, and a memory 22. Robotic arm 12 is operable to receive instructions from controller 16 via network 14. In one embodiment, controller 16 communicates instructions for robotic arm 12 to move along one or more paths.

Robotic arm 12 is any electro-mechanical device that is operable to move along a path. Robotic arm 12 is operable to move along two or more axes. Robotic arm 12 may be part of any suitable robot including a delta robot, Cartesian coordinate robot or any other similar robot. Robotic arm 12 may be operable to move at various velocities and may have any number of degrees of freedom. In one embodiment, robotic arm 12 is operable to receive instructions from controller 16 for moving along one or more paths. Robotic arm 12 may comprise a claw or grabber that is operable to hold and position objects such as milking cups or teat preparation cups for dairy industry applications. In some embodiments, robotic arm 12 may be operable to transmit information about its current position to controller 16.

Network 14 may include any interconnecting system capable of transmitting audio, video, signals, data, messages, or any combination of the preceding. Network 14 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 10.

Controller 16 may be any module comprising an interface 18, a processor 20, and a memory 22. Controller 16 may communicate with other aspects of system 10 via network 14. Controller 16 is operable to receive targeting information for robotic arm 12, process that information, and communicate path information to robotic arm 12.

Interface 18 represents any port or connection, real or virtual, including any suitable hardware and/or software, including protocol conversion and data processing capabilities, to communicate through a LAN, WAN, or other communication system that allows controller 16 to exchange information with robotic arm 12, or any other components of system 10. Interface 18 receives information from and transmits information to the various components of system 10. Interface 18 may communicate with processor 20 and memory 22.

Processor 20 may be any electronic circuitry, including, but not limited to microprocessors, application specific integrated circuits (ASIC), application specific instruction set processor (ASIP), and/or state machines, that communicatively couples interface 18 and memory 22 and controls the operation of controller 16. In some embodiments, processor 20 may be single core or multi-core having a single chip containing two or more processing devices. Processor 20 may be 8-bit, 16-bit, 32-bit, 64-bit or of any other suitable architecture. Processor 20 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 20 may include other hardware and software that operates to control and process information. Processor 20 may execute computer-executable program instructions stored in memory 22. Processor 20 is not limited to a single processing device and may encompass multiple processing devices.

Memory 22 may include any one or a combination of volatile or non-volatile local or remote devices suitable for storing information. For example, memory 22 may include RAM, ROM, flash memory, magnetic storage devices, optical storage devices, network storage devices, cloud storage devices, solid state devices, or any other suitable information storage device or a combination of these devices. Memory 22 stores, either permanently or temporarily, data, operational software, other information for processor 20, other components of controller 16, or other components of system 10. For example, memory 22 may store user preferences or default settings for operating controller 16. Memory 22 may store information in one or more databases, file systems, tree structures, relational databases, any other suitable storage system, or any combination thereof. Furthermore, different information stored in memory 22 may use any of these storage systems. The information stored in memory 22 may be encrypted or unencrypted, compressed or uncompressed, and static or editable. Memory 22 may store information in one or more caches.

In one embodiment, memory 22 may store a shared memory 24, a path generator 26, waypoint queue A 28, waypoint queue B 30, retargeting logic 32, and transition queue 40.

Shared memory 24 stores a plurality of waypoints defining any number of paths for robotic arm 12. A waypoint comprises positional and other relevant data. For example, a waypoint might comprise coordinates and the velocity with which robotic arm 12 approaches those coordinates. A path begins at a starting waypoint and ends at a destination waypoint. Robotic arm 12 moves along a path from the starting waypoint to the destination waypoint by passing through intermediate waypoints. Shared memory 24 may receive these paths from a user, by processor 20, or by any other suitable means. For illustrative purposes, shared memory 24 may store a first path for robotic arm 12 that starts at starting waypoint "a", ends at destination waypoint "f", and comprises waypoints [a; b; c; d; e; f]. While robotic arm 12 is moving along the first path, controller 16 may receive or generate instructions for robotic arm 12 to move to a second destination "z" via a second path [u; v; w; x; y; z]. Shared memory 24 may receive and store this second path as well.

Path generator 26 comprises logic that selects one or more subsets of the paths stored in shared memory 24 and stores those subsets in waypoint queue A 28 and waypoint queue B 30. For example, path generator 26 may select the subset [a; b; c; d] from the first path and store that subset in waypoint queue A 28. Similarly, path generator 26 may store the subset [u; v; w; x] from the second path in waypoint queue B 30. In one embodiment, robotic arm 12 moves along the path defined by waypoint queue A 28 until path generator 26 loads waypoints into waypoint queue B 30. Once path generator 26 loads waypoints into waypoint queue B 30, robotic arm 12 may transition from moving along the path defined by waypoint queue A 28 to moving along the path defined by waypoint queue B 30. To make the transition from waypoint queue A 28 to waypoint queue B 30 smooth, retargeting logic 32 generates a transition path for robotic arm 12 that combines the waypoints from waypoint queue A 28 and waypoint queue B 30.

Retargeting logic 32 comprises logic for combining the waypoint queue A 28 and waypoint queue B 30 to create a third queue defining a transitional path between the first path and the second path as illustrated in FIG. 2 and discussed in greater detail below. For example, if controller 16 instructs robotic arm 12 to transition from the first path to the second path, retargeting logic 32 may combine waypoint queue A 28 and waypoint queue B 30 to create a hybrid transitional queue that defines a third transition path between the first path and the second path. In the present example, retargeting logic 32 may combine the waypoints [a; b; c; d] from the first path stored in waypoint queue A 28 with waypoints [u; v; w; x] from the second path stored in waypoint queue B 30 to create a transition queue 40 defining a third transition path between the first path and the second path. In this example, retargeting logic 32 may create a third transition path having the waypoints: [a+0*u; 0.67*b+0.33*v; 0.33*c+0.67*w; 0*d+x]. In this manner, robotic arm 12 gradually transitions from the starting waypoint "a" of waypoint queue A 28 to the destination waypoint "x" of the waypoint queue B 30. Robotic arm 12 may then continue onto destination waypoint "z" of the second path.

In the embodiment discussed above, the weight applied to the waypoints of waypoint queue A 28 and waypoint queue B 30 increase and decrease at the same linear rate. For example, in the above example, the weight applied to the waypoints of waypoint queue A 28 decreases linearly from 1 to 0 across waypoints [a; b; c; d]. Correspondingly, the weight applied to the waypoints of waypoint queue B 30 increases linearly from 0 to 1 across waypoints [u; v; w; x].

In other embodiments, however, the weights may increase or decrease exponentially, geometrically, or in any other suitable linear or non-linear manner. For example, in one embodiment, the third transition path may have the waypoints [a+0*u; 0.9*b+0.1*v; 0.6*c+0.4*w; 0*d+x] where the weights applied to the waypoints of waypoint queue A 28 and waypoint queue B 30 increase and decrease at nonlinear rates.

In some embodiments, waypoint queue A 28 may not comprise the same number of waypoints as waypoint queue B 30. For example, waypoint queue A 28 may comprise four waypoints and waypoint queue B 30 may comprise six waypoints. In such a situation, retargeting logic 32 may extend waypoint queue A 28 to six waypoints by duplicating the destination waypoint of waypoint queue A 28 and appending the duplicated waypoint to the end of waypoint queue A 28. So for example, if waypoint queue A 28 has waypoints [a; b; c; d] and waypoint queue B 30 has waypoints [u; v; w; x; y; z], retargeting logic 32 may duplicate waypoint "d" and append it to waypoint queue A 28 to generate the new waypoint queue A 28 [a; b; c; d; d; d]. Similarly, if waypoint queue B 30 is shorter than waypoint queue A 28, retargeting logic 32 may duplicate the final waypoint of waypoint queue B 30 and append it onto the end of waypoint queue B 30.

In operation, robotic arm 12 moves along a queued portion of a first path. The first path is stored in shared memory 24 and path generator 26 queues a portion of the first path in the waypoint queue A 28. When controller 22 receives a new second path for robotic arm 12, that second path is also stored in shared memory 24 and path generator 26 queues a portion of the second path in the waypoint queue B 30. When both waypoint queue A 28 and waypoint queue B 30 are loaded with waypoints, retargeting logic 32 combines the two queues to create a third transitional path defined by a transitional waypoint queue. Robotic arm 12 then transitions from waypoint queue A 28 onto the waypoint queue B 30 by moving along the transitional waypoint queue. When robotic arm 12 reaches the end of the transitional waypoint queue, robotic arm 12 continues to move along the second path.

Further, controller 22 may receive or generate a new fourth path defining a new destination for robotic arm 12 while robotic arm 12 is moving along the transitional path between the first path and the second path. In such a situation, the fourth path is stored in shared memory 24 and path generator 26 replaces the waypoints from the first path stored in waypoint queue A 28 with a subset of the waypoints from the fourth path. This results in waypoint queue A 28 storing a portion of the waypoints from the fourth path while waypoint queue B 30 continues to store a portion of the second path. Retargeting logic 32 then combines the waypoints from waypoint queue B 30 and waypoint queue A 28 to generate a transitional path between the second and the fourth paths. However, in this case, retargeting logic 32 assigns decreasing weights to the waypoints in the waypoint queue B 30 and retargeting logic 32 assigns increasing weights to the waypoints of the waypoint queue A 28. Thus, for example, if the fourth path comprises waypoints [a'; b'; c'; d'; e'; f'] and the second path comprises waypoints [u; v; w; x; y; z], retargeting logic 32 may generate a new transition path comprising the waypoints [u+a'*0; 0.66*v+ 0.33*b'; 0.33*w+0.66*c'; 0*x+d']. In this manner, robotic arm 12 gradually transitions from the starting waypoint "u" of waypoint queue B 30 to the destination waypoint "d'" of the waypoint queue A 28. Robotic arm 12 may then continue onto destination waypoint "f'" of the fourth path.

FIG. 2 illustrates an example graph 50 showing a first path 52, a second path 56, and a transitional path 60. First path 52 has a destination 54 and second path 56 has a destination 58. In graph 50, robotic arm 12 originally travels along first path 52 toward destination 54 when controller 22 receives or generates instructions for robotic arm 12 to move onto second path 56. Using one embodiment of the disclosed system 12 explained above in relation to FIG. 1, controller 22 generates transition path 60 by combining waypoints from the first path 52 and second path 56. Robotic arm 12 then travels along transition path 60 to move from first path 52 onto second path 56. Once robotic arm 12 traverses transition path 60 and reaches second path 56, robotic arm 12 continues to move along second path 56 toward destination 58. As illustrated, transition path 60 starts closer to first path 52 and gradually moves away from first path 52 and toward second path 56.

FIG. 3 illustrates one embodiment of controller 22 showing a process flow between the components of controller 22. In this embodiment, interface 18 first receives waypoints for a first path that are either provided by a user, generated by processor 20, or provided by any other suitable source. The waypoints of the first path are stored in shared memory 24. Path generator 26 creates a subset of the waypoints for the first path and sends them to waypoint queue A 28. Retargeting logic 32 then communicates the waypoints from waypoint queue A 28 to robotic arm 12 and robotic arm 12 moves along the first path.

In this example embodiment, interface 18 further receives waypoints for a second path while robotic arm 12 is moving along the first path. The waypoints of this second path are stored in shared memory 24. Path generator 26 captures a subset of the waypoints for the second path and sends them to waypoint queue B 30. Retargeting logic 32 then combines the waypoints from waypoint queue A 28 and waypoint queue B 30 to create a hybrid transition path 100 for example in the manner described above in relation to FIG. 1. Retargeting logic 32 then communicates the hybridized transition path 100 to robotic arm 12 for robotic arm 12 to transition from the first path to the second path.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
    a robotic arm configured to communicate with a robotic arm controller and move along a path; and
    the robotic arm controller comprising:
        an interface configured to communicate with the robotic arm;
        a memory configured to store:
            a first path defining an original path for the robotic arm movement, the first path comprising a first set of ordered waypoints ranging from a first initial waypoint defining a beginning of the first path to a first final waypoint defining an ending of the first path, each waypoint defining a location and velocity with which to approach that location;
            a second path defining a first modified path for the robotic arm movement, the second path comprising a second set of ordered waypoints ranging from a second initial waypoint defining a beginning of the second path to a second final waypoint defining an ending of the second path;
        a processor configured to:
            assign a weight value to each waypoint of the first set of ordered waypoints to generate a first weighted set of ordered waypoints, wherein:
                weight values range from one to zero; and
                weight values are assigned to each waypoint in the first set of ordered waypoints in a decreasing order such that the first initial waypoint has a first highest weight and the first final waypoint has a first lowest weight;
            assign a weight value to each waypoint of the second set of ordered waypoints to generate a second weighted set of ordered waypoints, wherein:
                weight values range from zero to one; and
                weight values are assigned to each waypoint in the second set of ordered waypoints in an increasing order such that the second initial waypoint is associated with the first lowest weight and the second final waypoint is associated with the first highest weight;
            combine the first weighted set of ordered waypoints with the second weighted set of ordered waypoints generate a third path comprising a third set of ordered waypoints, wherein:
                each waypoint in the third set of ordered waypoints is the sum of corresponding waypoints from the first weighted set of ordered waypoint and the second weighted set of ordered waypoints; and
                the third path defines a transition path from the first path to the second path; and
            communicate instructions to the robotic arm to transition from the first path to the second path by traversing the third path.

2. The system of claim 1 wherein the processor is further configured to:
    determine that the first path has fewer waypoints than the second path; and
    extend the first path by duplicating the first final waypoint one or more times and appending the duplicated first final waypoints to the end of the first path until the first path has the same number of waypoints as the second path.

3. The system of claim 1 wherein the processor is further configured to:
    determine that the second path has fewer waypoints than the first path; and
    extend the second path by duplicating the second final waypoint one or more times and appending the duplicated second final waypoint to the end of the second path until the second path has the same number of waypoints as the first path.

4. The system of claim 1 wherein the third path comprises a combination of at least thirty weighted waypoints from the first path and at least thirty corresponding weighted waypoints from the second path to form an at least partially smooth transition path from the first path to the second path.

5. The system of claim 1 wherein:
    the interface is further configured to receive, while the robotic arm is moving along the third path, a fourth path comprising a fourth set of ordered waypoints ranging from a fourth initial waypoint to a fourth final waypoint; and the processor is further configured to:
associate a weight with each waypoint of the fourth path, wherein the weight associated with each waypoint of the fourth path increases at a second determined rate so that the fourth initial waypoint is associated with a second lowest weight and the fourth final waypoint is associated with a second highest weight;
associate a weight with each waypoint of the second path, wherein the weight associated with each waypoint of the second path decreases at the second determined rate so that the second initial waypoint is associated with the second highest weight and the second final waypoint is associated with the second lowest weight;
combine the fourth set of weighted waypoints and the corresponding second set of weighted waypoints to generate a fifth path; and
instruct the robotic arm to transition from the third path to the fourth path by traversing the fifth path.

6. The system of claim 1, wherein the first lowest weight is 0 and the first highest weight is 1.

7. The system of claim 1, wherein the processor is further configured to combine the weighted waypoints to generate the third path by adding each weighted waypoint of the first path to each corresponding weighted waypoint of the second path.

8. The system of claim 7, wherein the processor is configured to generate the third path by:
adding a first weighted waypoint of the first path to a first weighted waypoint of the second path to generate a first waypoint of the third path;
adding a second weighted waypoint of the first path to a second weighted waypoint of the second path to generate a second waypoint of the third path; and
adding an nth weighted waypoint of the first path to an nth weighted waypoint of the second path to generate an nth waypoint of the third path.

9. A method comprising:
assigning, by a processor, a weight value to each waypoint of a first set of ordered waypoints to generate a first weighted set of ordered waypoints, wherein:
the first set of ordered waypoints describe a first path defining an original path for a robotic arm movement,
the first set of ordered waypoints are arranged from a first initial waypoint defining a beginning of the first path to a first final waypoint defining an ending of the first path,
each waypoint defining a location and velocity with which to approach that location,
weight values range from one to zero, and
weight values are assigned to each waypoint in the first set of ordered waypoints in a decreasing order such that the first initial waypoint has a first highest weight and the first final waypoint has a first lowest weight;
assigning, by the processor, a weight value to each waypoint of a second set of ordered waypoints to generate a second weighted set of ordered waypoints, wherein:
the second set of ordered waypoints describe a second path defining a first modified path for the robotic arm movement,
the second set of ordered waypoints are arranged from a second initial waypoint defining a beginning of the second path to a second final waypoint defining an ending of the second path,
weight values range from zero to one, and
weight values are assigned to each waypoint in the second set of ordered waypoints in an increasing order such that the second initial waypoint is associated with the first lowest weight and the second final waypoint is associated with the first highest weight;
combining, by the processor, the first set of weighted waypoints with the second set of weighted waypoints to generate a third path comprising a third set of ordered waypoints, wherein:
each waypoint in the third set of ordered waypoints is the sum of corresponding waypoints from the first weighted set of ordered waypoints and the second weighted set of ordered waypoints, and
the third path defines a transition path from the first path to the second path; and
communicating, by the processor using an interface, instructions a robotic arm to transition from the first path to the second path by traversing the third path.

10. The method of claim 9 further comprising:
determining, by the processor, that the first path has fewer waypoints than the second path; and
extending, by the processor, the first path by duplicating the first final waypoint one or more times and appending the duplicated first final waypoints to the end of the first path until the first path has the same number of waypoints as the second path.

11. The method of claim 9 further comprising:
determining, by the processor, that the second path has fewer waypoints than the first path; and
extending, by the processor, the second path by duplicating the second final waypoint one or more times and appending the duplicated second final waypoint to the end of the second path until the second path has the same number of waypoints as the first path.

12. The method of claim 8 wherein the third path comprises a combination of at least thirty weighted waypoints from the first path and at least thirty corresponding weighted waypoints from the second path.

13. The method of claim 8 further comprising:
associating, by the processor, a weight with each waypoint of a fourth path, wherein the weight associated with each waypoint of the fourth path increases at a second determined rate so that a fourth initial waypoint is associated with a second lowest weight and a fourth final waypoint is associated with a second highest weight;
associating, by the processor, a weight with each waypoint of the second path, wherein the weight associated with each waypoint of the second path decreases at the second determined rate so that the second initial waypoint is associated with the second highest weight and the second final waypoint is associated with the second lowest weight;
combining, by the processor, the fourth set of weighted waypoints and the corresponding second set of weighted waypoints to generate a fifth path; and
instructing, by the processor, the robotic arm to transition from the third path to the fourth path by traversing the fifth path.

14. The method of claim 8, wherein the first lowest weight is 0 and the first highest weight is 1.

15. The method of claim 8, wherein combining the weighted waypoints to generate the third path including adding each weighted waypoint of the first path to each corresponding weighted waypoint of the second path.

16. The method of claim 15, wherein generating the third path further comprises:
adding a first weighted waypoint of the first path to a first weighted waypoint of the second path to generate a first waypoint of the third path;
adding a second weighted waypoint of the first path to a second weighted waypoint of the second path to generate a second waypoint of the third path; and
adding an nth weighted waypoint of the first path to an nth weighted waypoint of the second path to generate an nth waypoint of the third path.

17. A controller comprising:
an interface configured to communicate with a robotic arm;
a memory configured to store:
a first path defining an original path for the robotic arm, the first path comprising a first set of ordered waypoints ranging from a first initial waypoint defining a beginning of the first path to a first final waypoint defining an ending of the first path, each waypoint defining a location and velocity with which to approach that location;
a second path defining a first modified path for the robotic arm movement, the second path comprising a second set of ordered waypoints ranging from a second initial waypoint defining a beginning of the second path to a second final waypoint defining an ending of the second path;
a processor configured to:
assign a weight value to each waypoint of the first set or ordered waypoints to generate a first weighted set of ordered waypoints, wherein:
weight values range from one to zero; and
weight values are assigned to each waypoint in the first set of ordered waypoints in a decreasing order such that the first initial waypoint has a first highest weight and the first final waypoint has a first lowest weight;
assign a weight value to each waypoint of the second set of ordered waypoints to generate a second weighted set of ordered waypoints, wherein:
weight values range from zero to one; and
weight values are assigned to each waypoint in the second ordered waypoints in an increasing order such that the second initial waypoint is associated with the first lowest weight and the second final waypoint is associated with the first highest weight;
combine the first set of weighted waypoints with the second set of weighted waypoints to generate a third path comprising a third set of ordered waypoints, wherein:
each waypoint in the third set of ordered waypoints is the sum of corresponding waypoints from the first weighted set of ordered waypoints and the second weighted set of ordered waypoints; and
the third path defines a transition path from the first path to the second path; and
communicate instructions to the robotic arm to transition from the first path to the second path by traversing the third path.

18. The controller of claim 17 wherein the processor is further configured to:
determine that the first path has fewer waypoints than the second path; and
extend the first path by duplicating the first final waypoint one or more times and appending the duplicated first final waypoints to the end of the first path until the first path has the same number of waypoints as the second path.

19. The controller of claim 17 wherein:
the interface is further configured to receive, while the robotic arm is moving along the third path, a fourth path comprising a fourth set of ordered waypoints ranging from a fourth initial waypoint to a fourth final waypoint; and
the processor is further configured to:
associate a weight with each waypoint of the fourth path, wherein the weight associated with each waypoint of the fourth path increases at a second determined rate so that the fourth initial waypoint is associated with a second lowest weight and the fourth final waypoint is associated with a second highest weight;
associate a weight with each waypoint of the second path, wherein the weight associated with each waypoint of the second path decreases at the second determined rate so that the second initial waypoint is associated with the second highest weight and the second final waypoint is associated with the second lowest weight;
combine the fourth set of weighted waypoints and the corresponding second set of weighted waypoints to generate a fifth path; and
instruct the robotic arm to transition from the third path to the fourth path by traversing the fifth path.

20. The controller of claim 17, wherein the processor is configured to generate the third path by:
adding a first weighted waypoint of the first path to a first weighted waypoint of the second path to generate a first waypoint of the third path;
adding a second weighted waypoint of the first path to a second weighted waypoint of the second path to generate a second waypoint of the third path; and
adding an nth weighted waypoint of the first path to an nth weighted waypoint of the second path to generate an nth waypoint of the third path.

* * * * *